(12) United States Patent
Hussain

(10) Patent No.: US 8,843,764 B2
(45) Date of Patent: Sep. 23, 2014

(54) SECURE SOFTWARE AND HARDWARE ASSOCIATION TECHNIQUE

(75) Inventor: Muhammad Raghib Hussain, Saratoga, CA (US)

(73) Assignee: Cavium, Inc., San Jose, CA (US)

( * ) Notice: Subject to any disclaimer, the term of this patent is extended or adjusted under 35 U.S.C. 154(b) by 0 days.

(21) Appl. No.: 13/184,199

(22) Filed: Jul. 15, 2011

(65) Prior Publication Data

US 2013/0019105 A1   Jan. 17, 2013

(51) Int. Cl.
*H04L 29/00* (2006.01)

(52) U.S. Cl.
USPC ............................................. 713/189

(58) Field of Classification Search
USPC ............................ 713/189, 191, 193; 726/16
See application file for complete search history.

(56) References Cited

U.S. PATENT DOCUMENTS

| | | | |
|---|---|---|---|
| 4,278,837 A | 7/1981 | Best | |
| 5,469,363 A | 11/1995 | Saliga | |
| 6,278,782 B1 | 8/2001 | Ober et al. | |
| 6,289,455 B1 | 9/2001 | Kocher et al. | |
| 7,181,620 B1 | 2/2007 | Hur | |
| 7,188,089 B2 | 3/2007 | Goldthwaite et al. | |
| 7,206,943 B2 | 4/2007 | Kobayashi et al. | |
| 7,457,967 B2 | 11/2008 | Cocchi et al. | |
| 7,487,225 B2 | 2/2009 | Nishibe et al. | |
| 7,490,245 B2 * | 2/2009 | Waltermann et al. | 713/189 |
| 7,712,131 B1 | 5/2010 | Lethe | |
| 7,802,085 B2 * | 9/2010 | Graunke | 713/2 |
| 7,979,703 B2 | 7/2011 | Ellison et al. | |
| 8,209,542 B2 * | 6/2012 | Kumar et al. | 713/187 |
| 8,677,144 B2 | 3/2014 | Haider et al. | |
| 2004/0181692 A1 | 9/2004 | Wild et al. | |
| 2007/0240154 A1 | 10/2007 | Gerzymisch et al. | |
| 2008/0165765 A1 | 7/2008 | Neuhaus | |
| 2008/0196081 A1 | 8/2008 | Hajji et al. | |
| 2009/0217054 A1 | 8/2009 | Haider et al. | |
| 2011/0010421 A1 | 1/2011 | Chavez et al. | |
| 2011/0035795 A1 | 2/2011 | Shi | |
| 2012/0079287 A1* | 3/2012 | Leclercq | 713/192 |
| 2013/0254906 A1 | 9/2013 | Kessler et al. | |

OTHER PUBLICATIONS

Final Office Action received in U.S. Appl. No. 12/392,004, dated Dec. 5, 2012.
Non-Final Office Action received in U.S. Appl. No. 12/392,004, dated Mar. 18, 2013.
Final Office Action received in U.S. Appl. No. 12/392,004, dated Dec. 5, 2013.

(Continued)

*Primary Examiner* — Ali Abyaneh
(74) *Attorney, Agent, or Firm* — Hamilton, Brook, Smith & Reynolds, P.C.

(57) ABSTRACT

Authenticated hardware and authenticated software are cryptographically associated using symmetric and asymmetric cryptography. Cryptographically binding the hardware and software ensures that original equipment manufacturer (OEM) hardware will only run OEM software. Cryptographically binding the hardware and software protects the OEM binary code so it will only run on the OEM hardware and cannot be replicated or altered to operate on unauthorized hardware. In one embodiment, critical security information associated with the equipment is loaded from a memory at startup time. The critical security information is stored in the memory, in encrypted form, using a unique secret value. The secret value is used to retrieve a chip encryption key and one or more image authentication keys that can be used to associate program code with an original equipment manufacturer. These keys are used to authenticate the program code.

40 Claims, 6 Drawing Sheets

(56) References Cited

OTHER PUBLICATIONS

Non-Final Office Action in U.S. Appl. No. 13/427,148; Entitled "Hardware and Software Association and Authentication," dated Sep. 10, 2013.
Non-Final Office Action in U.S. Appl. No. 12/392,004; Date Mailed: May 17, 2012.
Non-Final Office Action in U.S. Appl. No. 12/392,004; Date Mailed: Mar. 18, 2013.
Notification of Transmittal of the International Search Report and the Written Opinion for Int'l Application No. PCT/US2013/033098; Date Mailed: Jun. 5, 2013.
Final Office Action in U.S. Appl. No. 12/392,004; Date Mailed: Aug. 7, 2013.
Final Office Action dated May 14, 2014 for U.S. Appl. No. 13/427,148.

* cited by examiner

SECURE SOFTWARE AND HARDWARE ASSOCIATION TECHNIQUE

BACKGROUND

Companies are experiencing loss of revenue and brand equity due to device clones and unauthorized production of products. The target of this cloning activity is to leverage research and development of original equipment manufacturers (OEMs) to offer similar and competing products at a lower cost. Naturally, this results in significant loss of profit and brand equity to the OEM. Examples include:

Non-branded Systems: Hardware designs are stolen and clone systems are built at lower quality. The manufacturers of such cloned systems also copy the software from the original product and offer a complete system (e.g., non-branded servers and routers) at very low cost.

Business Model Interruption: Hackers change the functionality of existing systems to behave and performance non-intended functions that disrupt the business model of OEMs.

Overbuilding: Contractors can overbuild equipment beyond the OEM's order and sell the unauthorized equipment with the same brand but with lower price and no revenue to the OEM.

The Trusted Computing Group (TCG) is an industry group including component vendors, software developers, systems vendors and network and infrastructure companies that develops and supports open industry specifications for trusted computing across multiple platform types. TCG has defined a Trusted Platform Module (TPM) specification for microcontrollers that store keys, passwords and digital certificates. Security processes, such as digital signature and key exchange, are protected through the secure TCG subsystem. Access to data and secrets in a platform could be denied if the boot sequence is not as expected. Critical applications and capabilities such as secure email, secure web access and local protection of data are thereby made much more secure. The TPM is not capable of controlling the software that is executed. The TCG subsystem can only act as a 'slave' to higher level services and applications by storing and reporting pre-runtime configuration information. Other applications determine what is done with this information. At no time can the TCG building blocks 'control' the system or report the status of applications that are running.

SUMMARY

Certain embodiments of the present invention relate to a cryptographically secure technique that protects original equipment manufacturer (OEM) hardware and OEM program code from theft and unintended use by cryptographically associating authenticated OEM hardware with authenticated OEM program code. Cryptographically associating the hardware and program code ensures that OEM hardware will only run OEM program code. Cryptographically associating the hardware and program code further protects the OEM program code so that it only runs on the OEM hardware and prevents the program code from being replicated or altered to operate on unauthorized hardware.

By requiring that program code only runs on associated authorized hardware, embodiments of present invention help to eliminate overbuilding issues, where unauthorized clones of OEM authorized hardware have become available. Certain embodiments require the basis of the association of binary image and hardware to be unique to the OEM hardware instance and unalterable.

Moreover, by requiring that hardware only runs associated authorized program code, embodiments of the present invention eliminate hacking issues that involve unauthorized supporting software usage or usage outside of agreed upon contracts or business models. To achieve these requirements, certain embodiments provide an unalterable mechanism for authenticating software binary images that is closely tied to the hardware.

Embodiments of the present invention may further include the mechanisms for associating the hardware with an OEM, for hardware and program code association. Further, certain embodiments may include the mechanism for transferring device ownership through a chain of trust. For example, the embodiments may assist in transferring device ownership when the hardware is transferred from an intermediate design manufacturer (ODM) to the final OEM.

Certain embodiments may assist in multi-ownership of hardware and program code. For example, certain embodiments may include the mechanism for handling situations in which an ODM takes ownership to debug a field-deployed system once the hardware or program code has been transferred to the final OEM.

Further, certain embodiments may assist in authentication-only modes, where "bring-up" program code images or diagnostics are authenticated and run on the hardware. While in the authentication-only mode, these program code images need not to be encrypted.

Certain embodiments may assist in updating security keys and trust basis. For example, embodiments may be used in situations where the OEM private key has been compromised. In such situations, the existing keys may be revoked and updated to new keys. Certain embodiments may further be used in facilitating transfer of ownership. For example, some embodiments may activate new ownership by revoking existing keys and replacing them with new keys.

Certain embodiments of the present invention may be used in disaster recovery in situations in which primary trust basis has been destroyed. In such cases, an alternate trust basis is supported to manage device ownership. To enable such mechanism, there are redundant keys for device ownership.

The solution offered by the SSHA are system and application independent and can seamlessly fit with existing multi-tier manufacturing flow, including change in hardware ownership and product returns.

Embodiments of the present invention may be a method, apparatus, or computer readable medium having computer readable program codes embodied therein for performing the method, of authenticating program code.

Certain embodiments may authenticate and associate a program code with an equipment. The embodiments may load critical security information associated with the equipment from a memory at startup time. The critical security information may be stored in the memory in encrypted form using a unique secret value. The unique secret value may identify an equipment associated with the program code. The embodiments may retrieve a chip encryption key and one or more image authentication keys associated with an original equipment manufacturer stored in the memory using the unique secret value. The embodiments may authenticate the program code using the chip encryption key and the one or more image authentication keys.

The unique secret value may be a master encryption key. In some embodiments, the unique secret value may be at least one of a symmetric key permanently programmed in the equipment or a secret key derived from equipment physical characteristics. The secret key may be derived from the equipment physical characteristics using a physically unclonable function. In certain embodiments, a relationship between the critical security information and the equipment may be established by encrypting the critical security information using the secret value.

The memory may be at least one of a main storage memory, a temporary storage memory, non-volatile memory on system-on-chip, and an external non-volatile memory. The equipment may be at least one of a network processor, a general purpose processor system-on-chip, or a mother board.

The critical security information may be programmed in the equipment during equipment manufacturing. The critical security information may include at least one of a device authentication key, a redundant device authentication key, the chip encryption key, the one or more image authentication keys, a memory protection key, and a secure storage key. Critical security information may be updated using the update messages. The update messages of the critical security information may be authenticated using at least one of the device authentication key or redundant device authentication key to ensure restriction of updating the critical security information to an owner of the device.

Certain embodiments may establish ownership of the equipment using at least one of the device authentication key and the redundant device authentication key. In some embodiments the equipment may be associated with an original equipment manufacturer using at least one of the device authentication key and the redundant device authentication key. The at least one of the device authentication key and the redundant device authentication key may be a public key associated with a private key of the original equipment manufacturer. The at least one of the device authentication key and the redundant device authentication key may be an Elliptic Curve Cryptography public key or an RSA public key associated with a private key of the original equipment manufacturer.

In certain embodiments ownership of the equipment may be transferred to a new owner by updating at least one of the device authentication key and the redundant device authentication key with public keys of a new owner. The at least one of the device authentication key and the redundant device authentication key may be updated using the chip encryption key and current device authentication key or redundant device authentication key.

In some embodiments, one or more image authentication keys may be retrieved using a master encryption key from the critical security information. The master encryption key may be generated using a cryptographically secure random number generator.

In certain embodiments, the program code may be protected using the chip encryption key. Further, some embodiments may control the encryption of the program code.

Embodiments of the present invention may assign the one or more image authentication keys to corresponding vendors to allow running of program code associated with other vendor under limited trusted ownership.

In certain embodiments, the program code may be authenticated by decrypting the program code using chip encryption key and the one of the image authentication keys.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
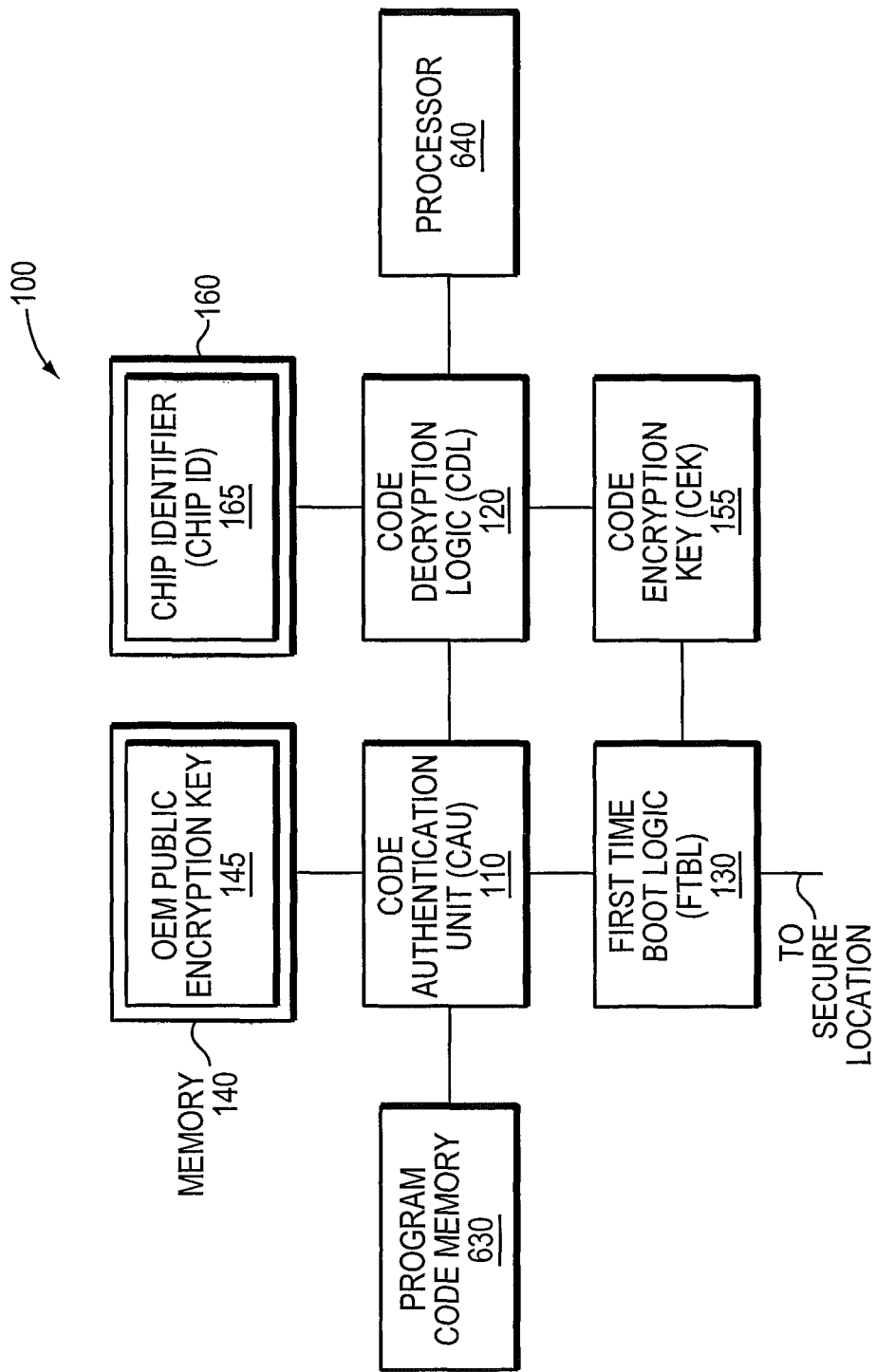
FIG. 1 illustrates a block diagram of an example of secure software and hardware association circuitry that may be used in cryptographic association mechanisms of the present invention.

FIG. 1 illustrates a block diagram of an example embodiment of secure software and hardware association (SSHA) circuitry 100 that may be used with embodiments of the present invention. The SSHA supports two capabilities:

Original equipment manufacturer (OEM) hardware will only run OEM software; and

OEM software will only run on OEM hardware.

As illustrated, the SSHA circuitry 100 includes a code authentication unit (CAU) 110, code decryption logic (CDL) 120 and first-time boot logic (FTBL) 130. The SSHA circuitry 100 is configured to be coupled between a processor 640 and a program code memory 630 to control the loading of the program code by the processor. The program code may be boot code or application software. The CAU 110, CDL 120 and FTBL 130 may be programmable logic or in a processor. In certain embodiments, a configurable (e.g., time-based) bypass may exist for debugging, development or evaluation purposes.

The SSHA circuitry 100 further includes a memory 140 configured to store a public asymmetric encryption key 145 associated with the OEM.

The CAU 110 authenticates the initial program code. The CAU 110 is configured to retrieve the public key 145 associated with the OEM from the memory 140. The CAU 110 is further configured to load and retrieve program code from the program code memory 630 for the processor 640. The CAU 110 authenticates the initial program code for the processor 640 by using the public key 145 retrieved from the memory 140.

In certain embodiments, the initial program code identifies a secure location associated with the OEM where an encrypted program code may be stored. The FTBL 130 establishes a secure connection to the secure location and receives a command from the secure location requesting a chip identifier token (ChipID token). The received command may be signed by a private asymmetric encryption key associated with the OEM. In response to the received command, FTBL 130 generates the ChipID token by using the public encryption key 145 to encrypt a chip identifier (ChipID) stored in memory.

In certain embodiments, the FTBL 130 may transmit the ChipID token to the secure location to be verified by the OEM. The ChipID token may be verified by matching the ChipID against a database of ChipIDs (not shown) that may be maintained by the OEM.

If the ChipID is a match, the FTBL 130 receives encrypted program code from the database. The encrypted program code may be encrypted by a symmetric code encryption key (CEK) 155 and signed using the OEM private key. The CAU 110 authenticates the signed encrypted program code by using the public key 145. The CDL 120 decrypts the authenticated encrypted program code by using a corresponding symmetric CEK 155 stored in a memory 150. In some embodiments, the CEK 155 is not transmitted during the secure connection, but rather is known as previously provided via an out-of-band communication.

In certain embodiments, the encrypted program code is stored in a memory associated with the system.

Figure 2:
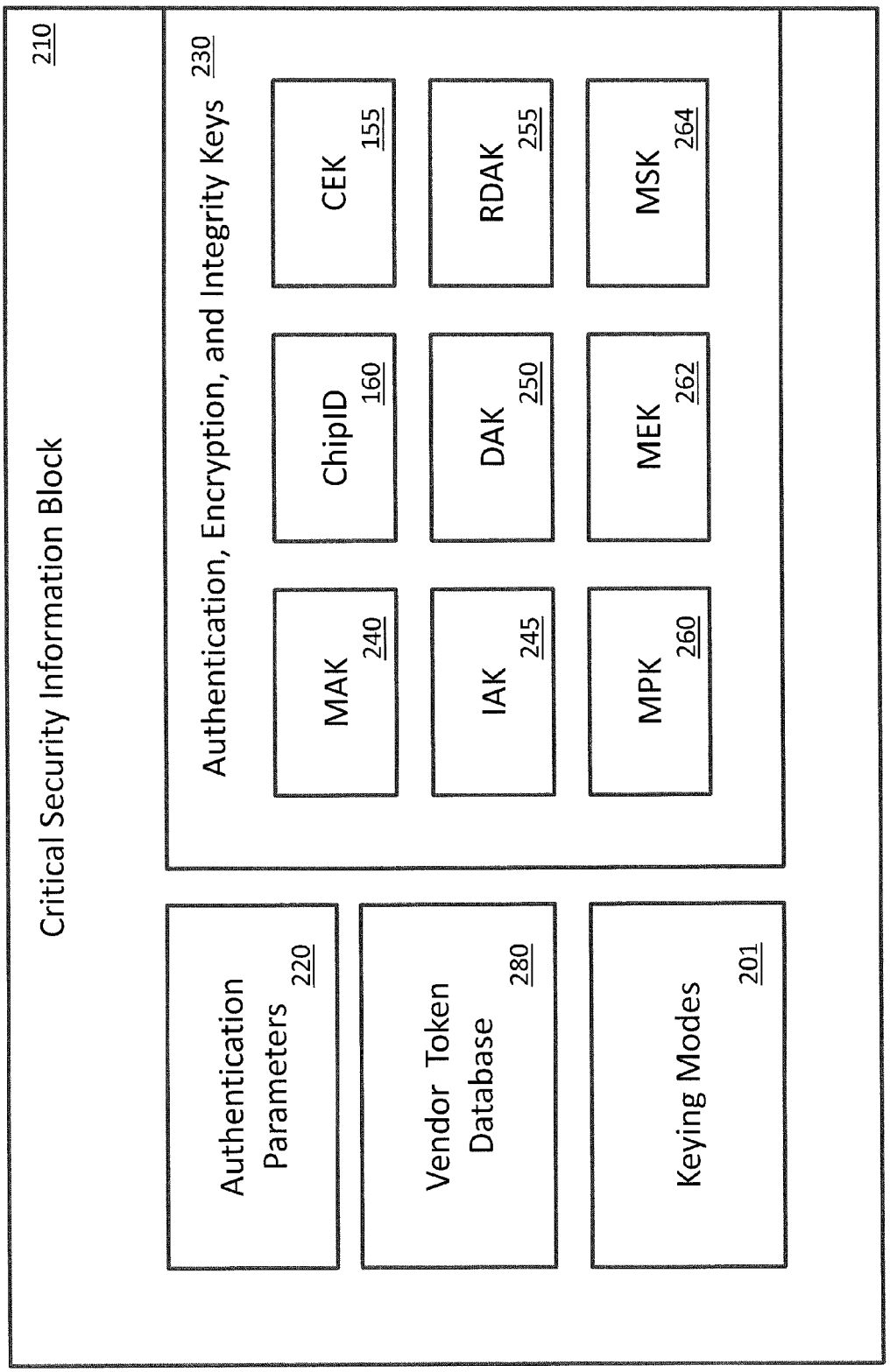
FIG. 2 illustrates a high-level block diagram of a critical security information block.

FIG. 2 illustrates a high-level block diagram 200 of a Critical Security Information Block (CSIB) 210. The CSIB 210 stores the information and keys used for authentication, encryption, and integrity 230. The CSIB 210 may also store authentication parameters 220 used to perform authentication operations.

Various keying modes 201 or options for storing the CSIB 210 may be used. For example, a direct keying mode in which the CSIB 210 is stored inside an SSHA-enabled device (not shown, e.g., silicon device) may be used. In certain embodiments, an indirect keying mode may be used. The indirect keying mode may store the CSIB 210 as part of a binary image. In certain embodiments, the CSIB 210 may be stored external to the SSHA-enabled device (e.g., flash device attached to the SSHA-enabled device).

The contents of the CSIB 210 block may be encrypted by a unique Advanced Encryption Standard (AES) key for each SSHA-enabled device. For example a unique AES 256-bit key such as a Maser AES Key (MAK) 240 may be used.

In certain embodiments, a MAK 240 keying mode may be selected and installed in an SSHA-enabled device during manufacturing of the SSHA-enabled device. The MAK 240 is not disclosed and is not accessible by anyone. In some embodiments, the MAK 240 may be designed so that it cannot be read out or changed. Further, the MAK 240 may remain the same for any given device having cryptographic association mechanisms according to embodiments of the present invention and may serve as the basis for establishing a relationship between the CSIB 210 and the device.

Embodiments of the present invention may implement the MAK 240 using various implementation techniques. For example, the MAK 240 may be established by using physical characteristics of the device. In certain embodiments, a physical unclonable function (PUF) may be used to establish the MAK 240. Certain embodiments may generate the MAK 240 by cryptographically mixing a true random number and the physical identity of the device. The true random number may be generated and inserted into the device at the time of manufacturing of the device.

In certain embodiments, a public asymmetric encryption key associated with an OEM may be retrieved from a certificate authority. In some embodiments, the OEM itself may serve as the certificate authority. The OEM public key may use any asymmetric cryptographic standard such as elliptic curve cryptography (ECC) and Rivest Shamir/Adleman (RSA). Further, a CDL (e.g., CDL 120 of FIG. 1) may generates a number referred to herein as a ChipID (e.g., ChipID 160 of FIG. 1) and an associated symmetric ChipID encryption key (CEK) (e.g., CEK 155 of FIG. 1).

The ChipID 160 is a value used as a unique identifier for the semiconductor product and may be any number, a random number, or sequence based. The ChipID 160 may be associated with the asymmetric public and private key pair.

In some embodiments, a device authentication key (DAK) 250 may be used. The DAK 250 is a public key used to establish the ownership of a device. The DAK 250 may be used to authenticate CSIB write and/or update messages. By authenticating the write/update messages, the DAK 250 controls the keys stored in CSIB. In certain embodiments, a corresponding private key (not shown) may be associated with the DAK 250. The device owner (i.e., OEM) owns the private key corresponding to DAK 250.

In some embodiments, a redundant device authentication key (RDAK) 255 may be used. The RDAK 255 is a redundant public key used to establish the ownership of a device. The RDAK 255 is used to authenticate CSIB write/update messages. By authenticating CSIB write/update messages, the RDAK 255 authenticates and controls the keys stored in CSIB. In certain embodiments, a corresponding private key (not shown) may be associated with the RDAK 255. The device owner (i.e., OEM) owns the private key corresponding to RDAK 255.

In certain embodiments, the RDAK 255 may be updated by DAK 250 or RDAK 255 private key owner using a CSIB update mechanism. The RDAK 255 implementation is optional and is not required for the complete functionality of the cryptographic association mechanisms described herein.

The CEK 155 may be any symmetric encryption key. The CEK 155 is associated with any given device having cryptographic association mechanisms according to embodiments of the present invention. The CEK 155 is part of CSIB 210 and is used to protect the binary image, which is the vendor software. The CEK 155 may be unique on a per device basis or it can be same for a group of devices or all devices belonging to an OEM.

Further, the CEK 155 may be changed over a secure connection by receiving a request signed by an associated asymmetric OEM private key that provides a new symmetric CEK 155. Moreover, the CEK 155 may be updated by the owner of the DAK 250 or RDAK 255 private keys using a CSIB update mechanism. The CEK may be read in a DAK 250 or RDAK 255 public key encrypted container using a CSIB access mechanism.

The ChipID 160 and CEK 155 may be stored in one-time programmable (OTP) memory or secure non-volatile memory (not shown). The CEK 155 preferably are not exposed or readable in plain format.

In certain embodiments, the CEK 155 is encrypted by the associated OEM public key to generate a CEK token (not shown).

Some embodiments may employ values encrypted by a public key (e.g., DAK 250 or RDAK 255) as cryptographic association tokens. For example, during the installation of the cryptographic association mechanisms, the ChipID and CEK token may be provided to the device provider to be stored in a Vendor Token Database (VTD) 280. Providing tokens generated by encrypting the CEK 155 using the OEM public key is to enforce viewing of the CEK 155 values by only the OEM who has access to an asymmetric OEM private key. The OEM private key preferably is not revealed to other parties, including the semiconductor manufacturer.

In certain embodiments, the device provider may not know the value of the CEK 155 and may only temporarily know the values of the CEK token so they are stored in the VTD 280. The device provider signs the VTD 280 using its private key and transfers the entire VTD 280 to the OEM over a secure connection. In some embodiments, the device provider destroys its copy of the VTD 280 once the transfer over the secure connection is completed. Thus, any record of production of the SSHA-enabled products is only available to the OEM as stored in the VTD 280.

In some embodiments, the VTD 280 may include a database of ChipID 160 as well as corresponding DAK 250 and RDAK 255 public key encrypted CEK tokens.

In some embodiments, an image authentication key (IAK) 245 may be used. The IAK 245 may include one or more public keys that are used to authenticate binary images that can run on corresponding SSHA-enabled devices.

In some embodiments, the IAK 245 may be stored in an indexed table used to refer to the keys during program code image authentication process.

In certain embodiments, the IAK 245 may be updated by the owner of DAK 250 or RDAK 255 private keys using CSIB update mechanism. In some embodiments, the IAK 245 may be read in a DAK 250 or RDAK 255 public key encrypted container using a CSIB access mechanism.

In some embodiments, a memory protection key (MPK) 260 may be used. The MPK 260 is an Advanced Encryption Standard (AES) base key used to protect contents of the main memory and is part of CSIB 210. In certain embodiments, the Dynamic Random Access Memory (DRAM) may be optionally divided into fully secure and protected regions. The DRAM controller of an SSHA-enabled processor may include built-in logic for encryption/decryption and scrambling/descrambling. Data stored in a fully secured region may be encrypted or decrypted using a memory encryption key (MEK) 262. In certain embodiments, the data stored to protected regions of the memory may be scrambled or descrambled using a memory scrambling key (MSK) 264. The MSK 264 and MEK 262 may be derived from MPK 260.

In some embodiments, the MEK 262 and/or MSK 264 may be derived from MPK 260 and a unique power on random number. A new MEK 262 and/or MSK 264 may be generated during every power on. The MEK 262 may be used to encrypt the contents of fully secure regions of the main memory. The MSK 264 may be used to scramble the contents of fully secure regions of the main memory. In certain embodiments, in addition to data scrambling, address scrambling may be performed so that the actual address appearing on the external buses are hard to track and correlate.

Certain embodiments may employ a secure storage key (SSK) 270. The SSK 270 is a 128-bit AES key that may be used to protect the contents of the non-volatile secure storage in flash memory. The SSK 270 may be updated by the owner of DAK 250 or RDAK 255 private keys using a CSIB update mechanism. The SSK 270 may be read in a DAK 250 or RDAK 255 public key encrypted container using a CSIB access mechanism.

Embodiments of the present invention may use standard cryptographic algorithms. In certain embodiments, an AES counter mode for binary image encryption may be used such that up to 256-bit keys are supported. Some embodiments may employ a secure Hash algorithm (e.g., SHA-2) to attain binary image integrity. In such embodiments, up to 512-bit keys may be supported. In some embodiments, image authentication may be performed by digital signature using asymmetric cryptographic standard (such as RSA or ECC suite B) with up to 4096-bit keys.

During manufacturing of devices, authentication and encryption parameters which are specified and provided by system vendors may be installed according to the specified configurations. The resulting vendor token databases (VTD) may be returned to the corresponding system vendor.

In a device enabled with authentication and encryption mechanisms described herein, the required parameters are specified by the system vendor. These parameters may include:
Cryptographic keys
    DAK 250 public key [required]
    RDAK 255 public key [optional]
    CEK 155 [needed if image encryption enabled]
    IAK 245 [at least one IAK required]
    MPK 260 [optional]
    SSK 270 [optional]
Configuration parameters
    Keying mode 201 (direct or indirect) [required]

Certain embodiments may run an authentication and encryption initialization program code over a secure server at the manufacturing facility. The server may receive the OEM specific information and certificates over a public network using SSL.

Figure 3:
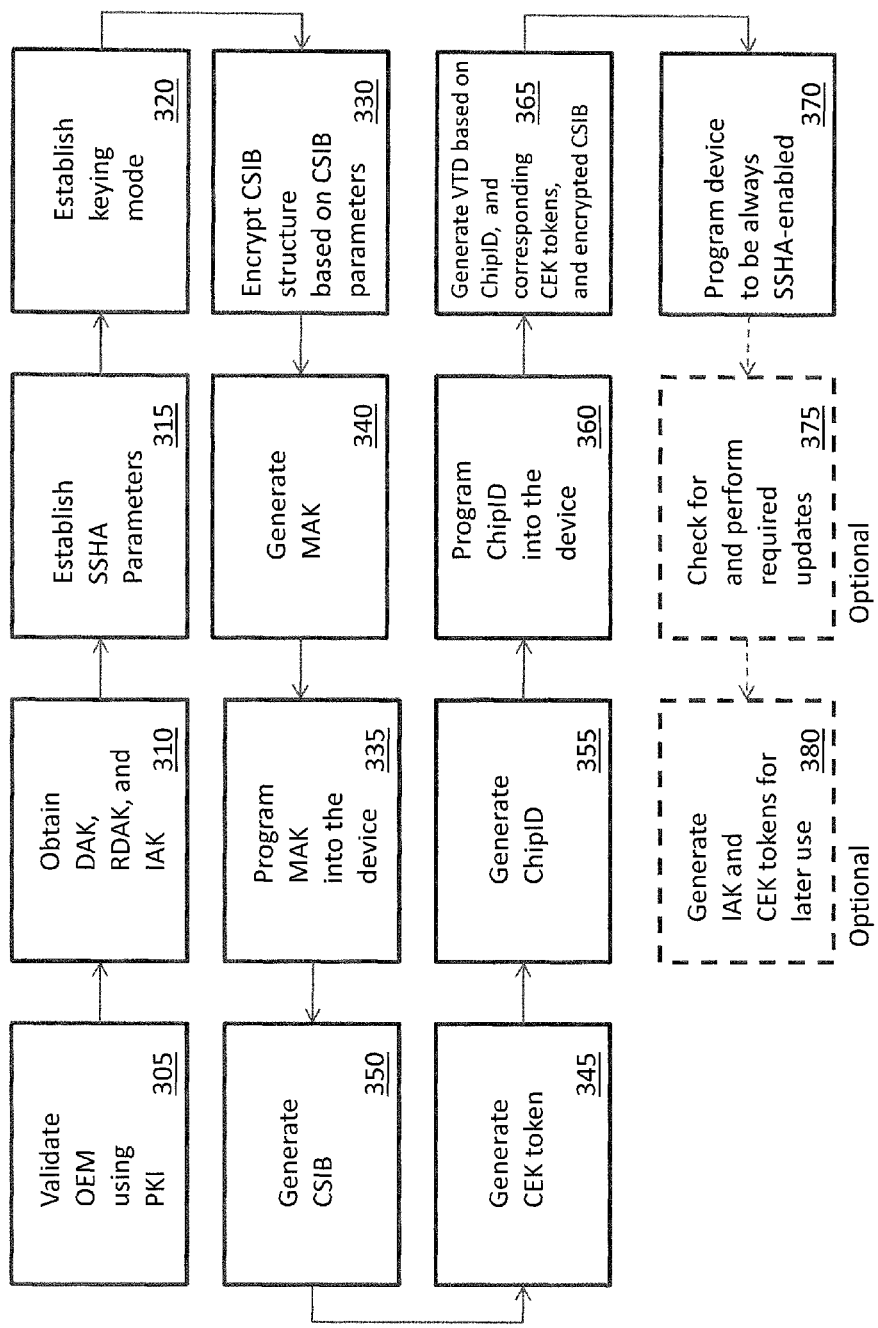
FIG. 3 is a block diagram of the initialization procedures for programming a device with cryptographic mechanisms according to embodiments of the present invention.

FIG. 3 includes a block diagram of the initialization procedures for programming a device with authentication and cryptographic mechanisms according to embodiments of the present invention. The Initialization program code may perform the following tasks:
Validate the OEM certificates using public key infrastructure (PKI) 305 and obtain DAK, RDAK and IAK values 310. In addition, the initialization program code may also establish some related authentication and cryptographic parameters 315 (hereinafter collectively referred to as SSHA parameters) such as authentication algorithm (RSA or ECC) and public key sizes.
Establish SSHA parameters 315: the SSHA keying parameters such as keying mode 320 may be specified. The remaining parameters may be used as default values for the CSIB, generated at the time of manufacturing and may be updated later by the OEM. The OEM may choose to provide extra values as required by their system manufacturing process.
    Embodiments of the present invention may employ direct or indirect keying modes. In a direct keying mode, the encrypted CSIB 330 is stored inside the silicon device. In an indirect keying mode, the encrypted CSIB 330 is stored external to the silicon device, typically in a flash memory device connected to the processor.
    Certain embodiments may employ optional parameters such as encryption keys (e.g., CEK) used to protect binary image. A true random number may be used as a default. In some embodiments, a symmetric key (e.g., MPK) may be used to protect the main memory content. A true random number may be used as the default number. Symmetric keys may be used to protect the main memory content. A true random number may be used as the default value.
Generate MAK 340 and program MAK into the device 335. The MAK 340 may be implemented based on PUF or externally injected into the device at initialization. Certain embodiments may generate the MAK 340 using a hardware random number generator (TRNG) or a PUF.
In non-PUF implementations, program MAK into the device 335.
Generate a CSIB 350 by encrypting the CSIB structure based on the CSIB parameters.
Generate a CEK token 345 by encrypting the CEK using the DAK public key.
Generate the ChipID 355 and program the generated ChipID 360 into the device.

Generate Vendor Token Database (VTD) by collecting ChipID and corresponding CEK Tokens and encrypted CSIB 365.

Program the device to be always SSHA-enabled 370.

In certain embodiments, at the end of the installation process, a secure server program code may send the VTD to the OEM over the Internet using a secure connection (e.g., socket layer (SSL)) and destroy the local copy.

In the direct mode, there is no external CSIB, the ChipID is readable, and therefore, the owner of private DAK or RDAK may retrieve CEK and IAK using a CSIB access mechanism. Hence, when operating in the direct mode, the VTD need not to be communicated to the OEM.

In certain embodiments, an initial sample image, optionally signed by an OEM private key may be used to check for CSIB updates and perform the necessary updates 375. In some embodiments, the initial sample image may generate CEK and IAK tokens using DAK for later use 380. In some embodiments, the sample image may disable CSIB updates for a current power cycle.

The program code binary images that run on an SSHA-enabled processor are always authenticated and may be optionally encrypted. In certain embodiments, each program code binary image may include an authentication header, an Encrypted CSIB (only if indirect keying mode is used), an authentication signature (also referred to as SSHA signature), as well as a program code binary to be executed. In some embodiments, the program code binary may be encrypted.

In certain embodiments, the authentication header may be referenced by the SSHA-enabled processor. The size of the authentication header may be fixed. For example, in one embodiment, the size of the authentication header may be 20 bytes. The authentication header may further include information such as an identifier constant string (e.g., "authentication"), version identifier (e.g., 0100), information regarding presence of CSIB (e.g., True (1) or False (0)), information identifying IAK index to be used (e.g., index into the array of IAKs in CSIB), type of authentication signature (e.g., RSA or ECC), and size of signature.

In some embodiments, the IAK index, provided in the authentication header, may be used by the SSHA-enabled processor to select the IAK that is stored inside the CSIB to authenticate the binary image.

Further, if indirect keying mode is used, the encrypted CSIB may also be included in the binary image. If direct keying mode is used, the encrypted CSIB is installed into the SSHA-enabled processor and does not need to be included in the software binary image. In certain embodiments, the OEM may receive the encrypted CSIB as part of the Vendor Token Database when an SSHA-enabled device is manufactured and shipped.

In some embodiments, the authentication signature may include information regarding version number (e.g., 0100), hashing algorithm type, hash of the binary image, size of the binary image, code encryption enable flag, secure memory encryption enable flag, secure memory scrambling enable flag, secure memory region address prefix (e.g., may be 128-byte aligned), secure memory region size in number of octets, secure flash region address prefix (128-byte aligned), secure flash region size in number of octets (0 for disable), and padding.

In certain embodiments, the SSHA-enabled processor may run the hash algorithm, included in the authentication signature, over the binary image and compare the hash result against the expected hash value, as provided in the authentication signature, to check for correctness. Moreover, the size of the image as observed by the SSHA-enabled processor may also be compared against the binary size which is provided by the authentication signature.

In some embodiments, the authentication signature may be used to indicate whether a binary image is encrypted. If it is determined that the binary image is encrypted, the SSHA-enabled processor may decrypt the image using the CEK, which is stored in the CSIB.

The authentication signature may also specify instructions for securing a DRAM region and/or a flash memory region. In the DRAM regions, contents stored into the specified secure region may be encrypted and/or scrambled. The secure DRAM region may be aligned at cache line boundaries (e.g., 128-byte for some processors).

In certain embodiments, memory encryption may use the MEK value, which is generated by using the MPK stored in CSIB and a random number during power on. Memory scrambling may use the MSK, which is generated by using the MPK stored in CSIB and a random number during power on. Therefore, new MEK and MSK values are generated during every power on.

In some embodiments, the contents stored into specified regions of flash memory may also be encrypted. For example, if the authentication signature includes a non-zero size of secure flash region, the content stored in the secure flash region may be encrypted using the SSK, which is stored in CSIB. Secure flash region may be aligned at cache line boundaries (e.g., 128-byte for some processors).

Figure 4:
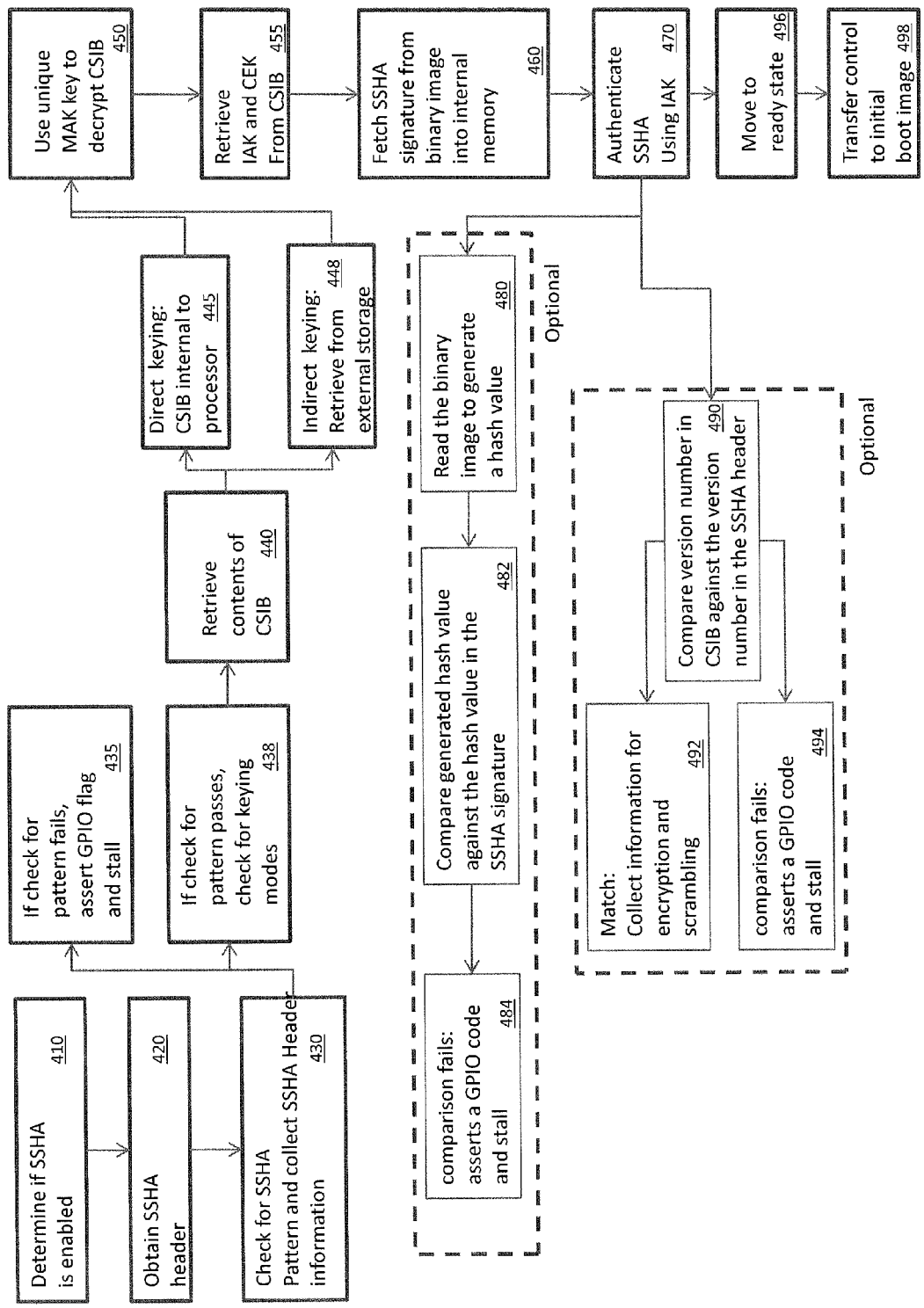
FIG. 4 is a block diagram of the processor initialization sequence that may be used in certain embodiments of the invention.

FIG. 4 is a block diagram of the processor initialization sequence that may be used in certain embodiments of the invention. The operating system of an SSHA-enabled system initializes (i.e., boots) using the following sequence:

At the time of power-on or reset, determine if SSHA is enabled or not 410.

If SSHA is enabled, use a finite state machine (FSM) of the processor to fetch a fixed size SSHA header from the boot location 420. The program code image is expected to be at the boot location.

Check for fixed patterns and collect information such as version, type of signature and signature length 430.

If the fixed pattern check fails 435, assert a general purpose input/output (GPIO) flag and stall or jump to a specific location after disabling the system to a limited debug only mode.

If the fixed pattern check passes 438, use a SSHA finite state machine to check for the keying mode.

Retrieve and read the content of the CSIB 440. For direct keying mode 445, CSIB may be found internal to the processor. For indirect keying mode 448, the processor may retrieve the CSIB from the external storage into its internal memory. Specifically, for indirect keying mode, the CSIB may be a part of the binary image.

Retrieve the required IAK and CEK 455 from CSIB using unique processor MAK to decrypt the CSIB content 450.

Fetch the authentication signature from the binary image into internal memory 460.

Authenticate the authentication signature using the specified IAK public key 470.

In certain embodiments, the processor may optionally read in the binary image to generate a hash value 480 and to compare it against the hash value in the authentication signature 482. If the comparison fails 484, the processor may assert a GPIO code and stall or jump to a specific location after disabling the system to a limited debug only mode.

In certain embodiments, the processor may optionally compare the version number stored inside the CSIB against the version number in the authentication header 490. If they do not match 494, the processor may assert a GPIO code and stalls or jump to a specific location after disabling the system to a limited debug only mode If the two version numbers match 492, the processor may collect information from the authentication signature and CSIB and programs the corresponding states in DRAM controller and its internal CSR for encryption and scrambling control. In certain embodiments, the processor may use the MEK and MSK respectively for encryption and scrambling protection. These keys may be generated using the MPK stored in CSIB and a random number generated during power on of the processor. The processor may configure the Boot bus controller for encryption control, in the case that the authentication signature specifies a secure flash region protected by the SSK stored in CSIB.

If authentication passes, the system is moved to the ready state and reset for the processor is de-asserted 496. Control is transferred to the initial boot image (i.e., authenticated) 498. In certain embodiments, the authentication logic may decrypt the boot image as it executes. The initial image performs the remainder of system initialization similar to normal boot image.

When multiple processors are used, all the processors go through a similar boot sequence individually and in parallel to one another.

The manufacturing process of an SSHA-enabled device generates the initial content of CSIB. After this point, the CSIB content may be updated by submitting CSIB update messages to the corresponding SSHA-enabled device. This process includes creation of CSIB update messages and processing of the submitted CSIB update messages by the target SSHA-enabled device.

Certain embodiments of the present invention may create a CSIB update message by invoking the relevant CSIB update message creation function and specifying the CSIB content to be updated. The CSIB update message creation functions encrypt the CSIB update message using a CEK that matches the version stored in the current CSIB. These functions may sign the CSIB update message using the provided DAK or RDAK private key. The created CSIB update message includes instruction specifying which CSIB content to update. The CSIB may pairs up with the corresponding SSHA-enabled processor, such that the unique MAK of the processor encrypts the CSIB content and it may only be updated by the pairing processor. The CSIB update messages may be transferred to the system which includes the processor.

In certain embodiments, to update the CSIB based on the received update message, the processor may authenticate the CSIB update message using the DAK and RDAK public keys found in the current CSIB. The message may be authenticated properly by either the DAK or RDAK public key. If both keys fail to authenticate the CSIB update message, the CSIB update message is declared invalid, and the processor signals an error. The CSIB update message may be decrypted using the CEK found in the current CSIB and the CSIB content may be updated as instructed in the decrypted message. In some embodiments, if any error is encountered during the update, the CSIB content does not change, and an error status is returned.

In some embodiments, CSIB content such as DAK update, RDAK update, CEK update, IAK update (for one or more IAK), MPK update, and SSK update may be updated.

The content of the encrypted CSIB may be accessed by submitting CSIB access messages to the corresponding SSHA-enabled device. This process includes generation of CSIB access messages and processing of the submitted CSIB access messages. The requested information is returned in the form of SSHA tokens.

CSIB access messages may be created by invoking the relevant CSIB access message creation function and specifying the CSIB content to be accessed. The CSIB access message creation functions encrypt the CSIB access message using the CEK. Moreover, these functions may sign the CSIB access message using the provided DAK or RDAK private key. The created CSIB access message includes the instruction of which CSIB content to return in the form of SSHA tokens.

In some embodiments, the CSIB access instructions may be transferred to the system which includes the SSHA-enabled processor that pairs up with the CSIB to be accessed. Since the CSIB is encrypted by the unique MAK of its corresponding processor, only the paired SSHA-enabled processor can access the CSIB.

Figure 5:
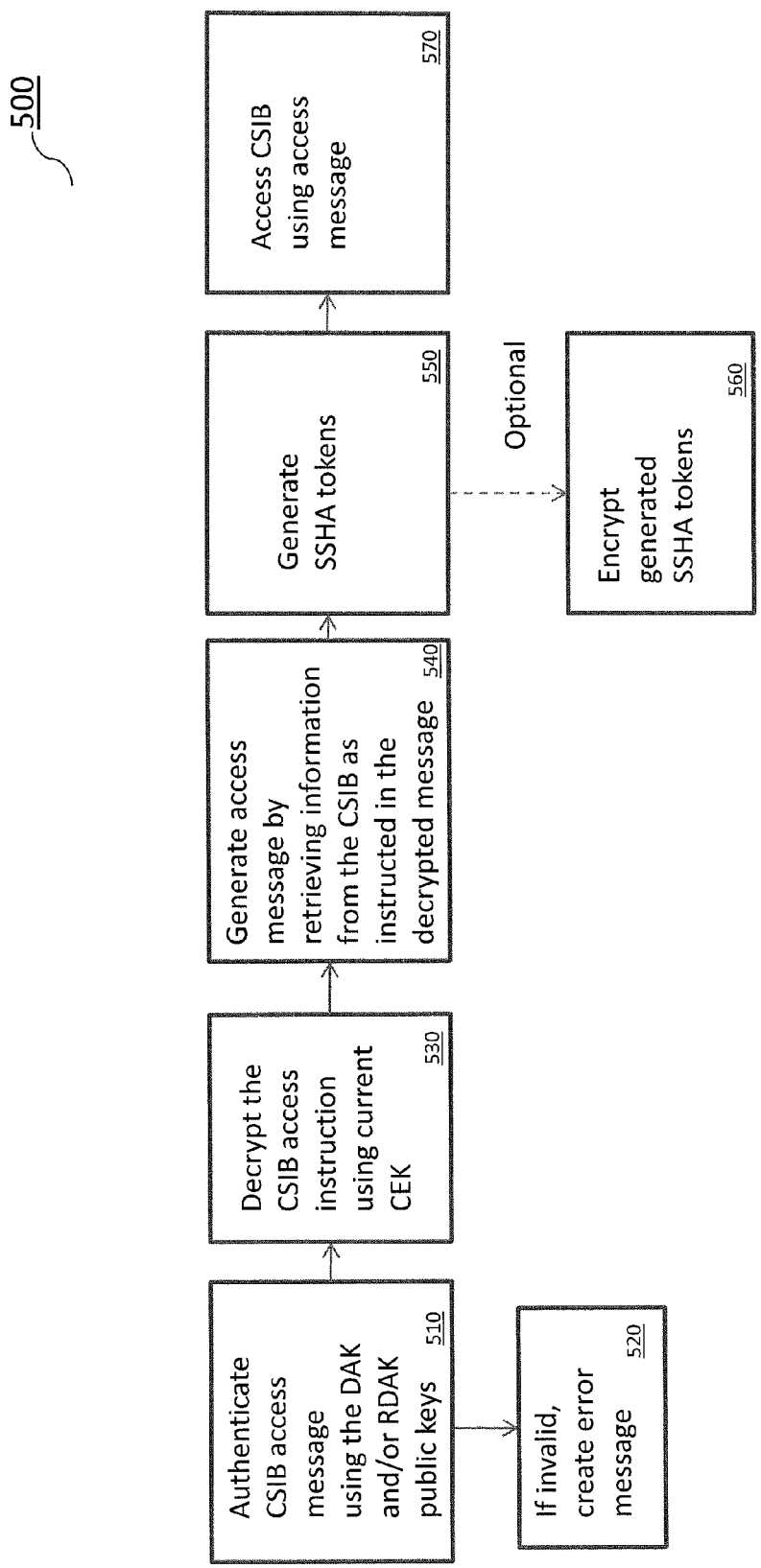
FIG. 5 is a diagram of the procedures for accessing the Critical Security Information Block.

FIG. 5 is a block diagram 500 of the procedures for accessing CSIB. To access CSIB per the received instruction, the processor may authenticate the CSIB access message using the DAK and/or RDAK public keys found in the current CSIB 510.

Either of these public keys may be used to authenticate the CSIB access message properly. If both keys fail to authenticate the CSIB access message, then the message is invalid, and an error status is returned 520.

The processor may further decrypt the CSIB access instruction using the CEK found in the current CSIB 530 and retrieve information from the CSIB as instructed in the decrypted message 540. Moreover, the processor may generate SSHA tokens using the decrypted message 550. These tokens may be encrypted by the DAK and RDAK public keys 560. If any error is encountered during the access sequence, an error status is returned. The CSIB may be accessed using the access message 570.

During CSIB access, the current MEK and MSK keys as well as information such as RAK public key, DAK public key, CEK, IAK (all or one of the IAK given an index), MPK, MEK, MSK, and SSK may be accessed.

Once a CSIB access message is created, it may be transferred to the system where the CSIB to be accessed and the corresponding processor are located to access the CSIB content as instructed by the message.

In certain embodiments, the CSIB access tokens, which are encrypted by the DAK and RDAK public keys, may be returned. The returned CSIB access token may be transferred back to the system where the original access message was created. On this system, the CSIB access tokens may be decrypted using the DAK or RDAK private key to retrieve the requested CSIB content. The type of CSIB content contained in the tokens may be specified inside the tokens. If the access function targets a type of CSIB content that does not match what the token specifies, an error status may be returned.

The binary image that runs on an SSHA-enabled processor requires authentication by the specified IAK key stored in CSIB. The binary image may be optionally encrypted by the CEK key.

For indirect keying mode, the CSIB update mechanism is not complete until the OEM generates a new binary image with the updated CSIB and runs it on the SSHA-enabled processor.

In some embodiments, for debug and diagnostic purposes, it is sometimes desirable to use clear text binary image and disable the optional memory and flash protection mechanisms. In such embodiments, the OEM may enable a third party, for example the ODM or software vendor, to apply their own binary images. These binary images are signed by an IAK and an IAK index provided by the OEM. The OEM uses the CSIB update mechanism to add this IAK into the indexed location of the IAK within the CSIB. The OEM may always revoke the provided IAK by updating the CSIB using the CSIB mechanism. In certain embodiments, the optional memory and flash protection mechanisms are specified within the authentication signature of the binary image.

In some embodiments, the binary image for the application may be upgraded in a boot code field upgrade. The OEM may further upgrade the program code by generating a new binary image with the required code changes and encrypt using the CEK.

In situations, when it is desirable for OEM to ensure that only the updated binary image is used, the OEM may update the CEK stored in CSIB by using the CSIB update mechanism. Then the SSHA-enabled processor may only run binary images which are encrypted with the new CEK.

In the situations where either the DAK or RDAK is compromised and needs to be revoked, the OEM may generate a new pair of private and public keys, and update the compromised public key by using the CSIB update mechanism.

Device ownership may be transferred by updating DAK and RDAK and subsequently updating CEK and IAK. The OEM which desires to transfer the ownership to the new OEM may use the public key of the new OEM using the PKI infrastructure and update the DAK and RDAK public key values in CSIB by using the CSIB update mechanism.

Even though device ownership has been transferred to the new owner, the previous owner image may still run as CEK and IAK are not updated. The new owner may update CEK and IAK to completely transfer of the device to itself. However, it may leave the IAK of previous owner to allow multi-ownership such that images from both OEM can run on the device. If the new OEM desires to keep complete secrecy of its binary image, it may update the CEK.

Figure 6:
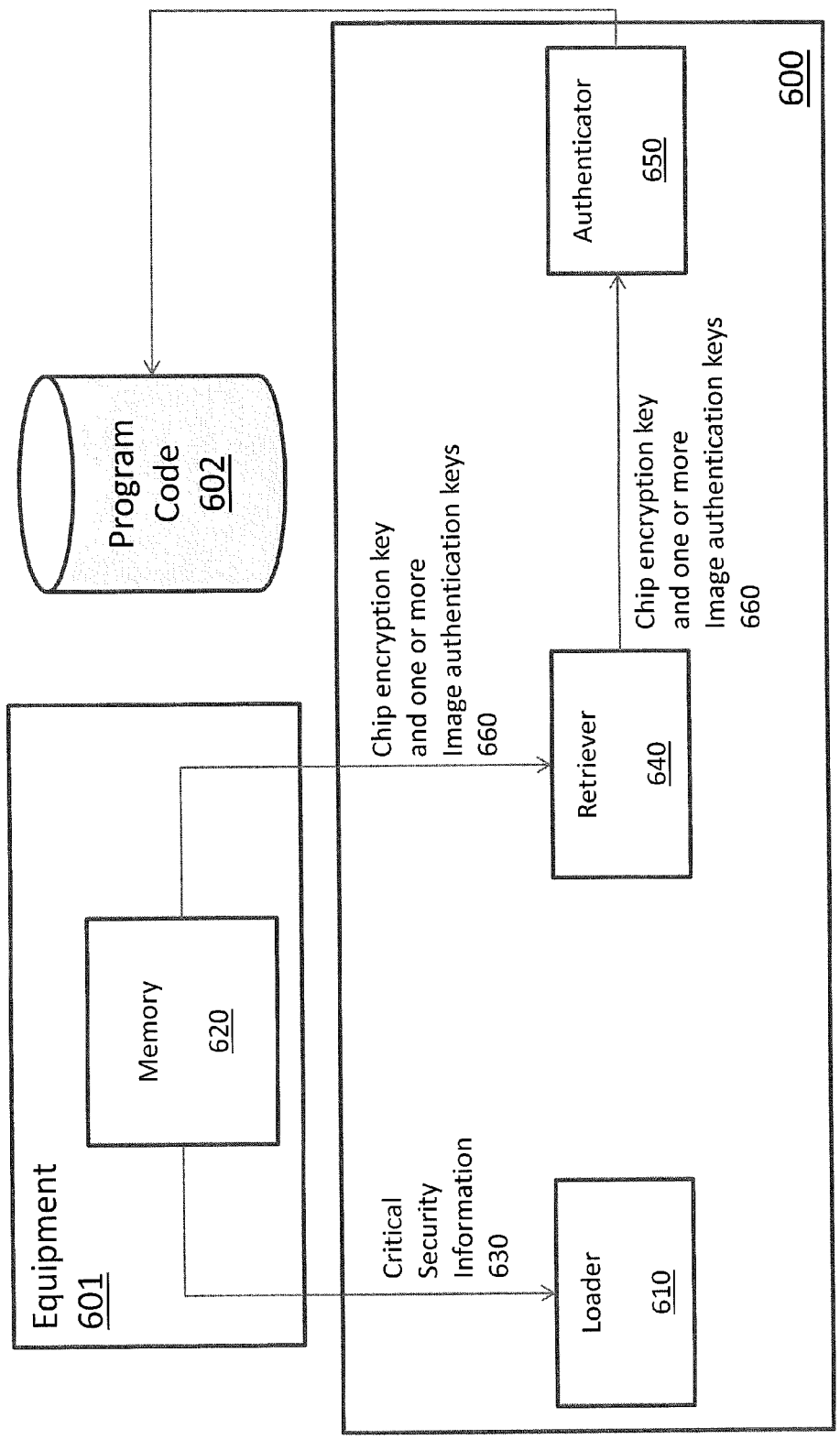
FIG. 6 is a block diagram of an embodiment of the present invention.

FIG. 6 is a block diagram of an embodiment of the present invention. A system 600 for authenticating and associating a program code 602 with an equipment 601 may include a loader 610 that loads critical security information 630 associated with the equipment from a memory 620 at startup time. The critical security information 630 is stored in the memory 620 in encrypted form using a unique secret value (not shown). The unique secret value identifying an equipment associated with the program code. The system further includes a retriever 640 and an authenticator 650. The retriever 640 retrieves a chip encryption key and one or more image authentication keys 660 associated with an original equipment manufacturer stored in the memory 620 using the unique secret value. The authenticator 650 authenticates the program code using the chip encryption key and the one or more image authentication keys 660.

Implementations of flow diagrams illustrating example embodiments may be implemented in a form of hardware, firmware, software, and combinations thereof. If implemented in software, the software may be any suitable language, stored on any form of non-transitory computer readable medium, such as random access memory (RAM), read only memory (ROM), compact disk read only memory (CD-ROM), flash memory, hard drive, and so forth, and be loaded and executed by a processor. The processor can be any general or application-specific processor that can execute the software in a manner consistent with the principles of the present invention, as claimed and illustrated by the example embodiments presented herein.

While this invention has been particularly shown and described with references to example embodiments thereof, it will be understood by those skilled in the art that various changes in form and details may be made therein without departing from the scope of the invention encompassed by the appended claims.

What is claimed is:

1. A method for authenticating and associating a program code with an equipment, the method comprising:
    associating critical security information with an original equipment manufacturer (OEM) of the equipment by encrypting the critical security information using a unique secret value, the unique secret value identifying the OEM of the equipment associated with the critical security information, the critical security information programmed in a memory during equipment manufacturing, the critical security information including a device authentication key, a redundant device authentication key, a chip encryption key, and one or more image authentication keys;
    loading critical security information associated with the OEM of the equipment from the memory at an initial startup time;
    retrieving the chip encryption key and the one or more image authentication keys stored in the critical security information associated with the OEM of the equipment in the memory by decrypting the critical security information using the unique secret value;
    authenticating the program code using the chip encryption key and the one or more image authentication keys; and
    transferring ownership of the equipment to a new owner by updating at least one of the device authentication key of the critical security information and the redundant device authentication key of the critical security information with at least one public key of the new owner.

2. The method of claim 1 wherein the unique secret value is a master encryption key.

3. The method of claim 1 wherein the memory is at least one of a main storage memory, a temporary storage memory, non-volatile memory on system-on-chip, and an external non-volatile memory.

4. The method of claim 1 wherein the equipment is at least one of a network processor, a general purpose processor system-on-chip and a mother board.

5. The method of claim 1 wherein the critical security information further includes at least one of a memory protection key and a secure storage key.

6. The method of claim 1 further including establishing ownership of the equipment using at least one of the device authentication key and the redundant device authentication key.

7. The method of claim 1 further including associating the equipment with the OEM using at least one of the device authentication key and the redundant device authentication key.

8. The method of claim 7 wherein the at least one of the device authentication key and the redundant device authentication key is a public key associated with a private key of the OEM.

9. The method of claim 7 wherein the at least one of the device authentication key and the redundant device authentication key is an Elliptic Curve Cryptography public key or an RSA public key associated with a private key of the OEM.

10. The method of claim 1 further including updating at least one of the device authentication key and the redundant device authentication key using the chip encryption key.

11. The method of claim 1 further including authenticating critical security information update messages for disaster recovery using the redundant device authentication key.

12. The method of claim 1 further including authenticating update messages of the critical security information using at least one of the device authentication key or redundant device authentication key to ensure restriction of updating the critical security information to an owner of the device.

13. The method of claim 1 wherein the unique secret value is at least one of a master encryption key, a symmetric key permanently programmed in the equipment or a secret key derived from equipment physical characteristics.

14. The method of claim 13 wherein the secret key is derived from the equipment physical characteristics using a physically unclonable function.

15. The method of claim 13 further including generating the master encryption key using a cryptographically secure random number generator.

16. The method of claim 1 further including retrieving the one or more image authentication keys using a master encryption key.

17. The method of claim 1 further including protecting the program code using the chip encryption key.

18. The method of claim 1 further including controlling encryption of the program code.

19. The method of claim 1 wherein authenticating the program code further includes decrypting the program code using the chip encryption key and the one or more image authentication keys.

20. A method for authenticating and associating a program code with an equipment, the method comprising:
associating critical security information with an original equipment manufacturer (OEM) of the equipment by encrypting the critical security information using a unique secret value, the unique secret value identifying the OEM of the equipment associated with the critical security information, the critical security information programmed in a memory during equipment manufacturing, the critical security information including a chip encryption key and one or more image authentication keys;
loading the critical security information associated with the OEM of the equipment from the memory at an initial startup time;
retrieving the chip encryption key and the one or more image authentication keys stored in the critical security information associated with the OEM of the equipment in the memory by decrypting the critical security information using the unique secret value;
authenticating the program code using the chip encryption key and the one or more image authentication keys; and
assigning the one or more image authentication keys to corresponding vendors to allow running of program code associated with other vendors under limited trusted ownership.

21. A system for authenticating and associating a program code with an equipment, the system comprising:
a memory;
an associater that associates critical security information with an original equipment manufacturer (OEM) of the equipment by encrypting the critical security information using a unique secret value, the unique secret value identifying the OEM of the equipment associated with the critical security information, the critical security information programmed in the memory during equipment manufacturing, the critical security information including a device authentication key, a redundant device authentication key, a chip encryption key, and one or more image authentication keys;
a loader that loads the critical security information associated with the OEM of the equipment from the memory at an initial a startup time;
a retriever that retrieves the chip encryption key and the one or more image authentication keys stored in the critical security information associated with the OEM of the equipment in the memory by decrypting the critical security information using the unique secret value; and
an authenticator that authenticates the program code using the chip encryption key and the one or more image authentication keys; and
a transferor that transfers ownership of the equipment to a new owner by updating at least one of the device authentication key of the critical security information and the redundant device authentication key of the critical security information with public keys of the new owner.

22. The system of claim 21 wherein the unique secret value is a master encryption key.

23. The system of claim 21 wherein the memory is at least one of a main storage memory, a temporary storage memory, non-volatile memory on system-on-chip, and an external non-volatile memory.

24. The system of claim 21 wherein the equipment is at least one of a network processor, a general purpose processor system-on-chip and a mother board.

25. The system of claim 21 wherein the critical security information includes at least one of a memory protection key and a secure storage key.

26. The system of claim 21 further including a verifier that establishes ownership of the equipment using at least one of the device authentication key and the redundant device authentication key.

27. The system of claim 21 further including an identifier that associating the equipment with the OEM using at least one of the device authentication key and the redundant device authentication key.

28. The system of claim 27 wherein the at least one of the device authentication key and the redundant device authentication key is a public key associated with a private key of the OEM.

29. The system of claim 27 wherein the at least one of the device authentication key and the redundant device authentication key is an Elliptic Curve Cryptography public key or an RSA public key associated with a private key of the OEM.

30. The system of claim 21 further including an updater that updates at least one of the device authentication key and the redundant device authentication key using the chip encryption key.

31. The system of claim 21 further wherein the authenticator authenticates critical security information update messages for disaster recovery using the redundant device authentication key.

32. The system of claim 21 further wherein the authenticator authenticates update messages of the critical security information using at least one of the device authentication key or redundant device authentication key to ensure restriction of updating the critical security information to an owner of the device.

33. The system of claim 21 wherein the unique secret value is at least one of a symmetric key permanently programmed in the equipment or a secret key derived from equipment physical characteristics.

34. The system of claim 33 wherein the secret key is derived from the equipment physical characteristics using a physically unclonable function.

35. The system of claim 33 further including a generator that generates the master encryption key using a cryptographically secure random number generator.

36. The system of claim 21 wherein the retriever retrieves the one or more image authentication keys using a master encryption key.

37. The system of claim 21 further including a protector that protects the program code using the chip encryption key.

38. The system of claim 21 further including a controller that controls encryption of the program code.

39. The system of claim 21 wherein the authenticator authenticates the program code further includes decrypting the program code using the chip encryption key and the one or more image authentication keys.

40. A system for authenticating and associating a program code with an equipment, the system comprising:
- a memory;
- an associater that associates critical security information with an original equipment manufacturer (OEM) of the equipment by encrypting the critical security information using a unique secret value, the unique secret value identifying the OEM of the equipment associated with the critical security information, the critical security information programmed in the memory during equipment manufacturing, the critical security information including a chip encryption key and one or more image authentication keys;
- a loader that loads the critical security information associated with the OEM of the equipment from the memory at an initial a startup time;
- a retriever that retrieves the chip encryption key and the one or more image authentication keys stored in the critical security information associated with the OEM of the equipment in the memory by decrypting the critical security information using the unique secret value; and
- an authenticator that authenticates the program code using the chip encryption key and the one or more image authentication keys; and
- an assigner that assigns the one or more image authentication keys to corresponding vendors to allow running of program code associated with other vendors under limited trusted ownership.

\* \* \* \* \*